(12) United States Patent
Grecco

(10) Patent No.: US 7,188,945 B2
(45) Date of Patent: Mar. 13, 2007

(54) EYEGLASS SYSTEM HAVING SPINNING BEZELS

(76) Inventor: Jason T. Grecco, 1026 Simpson Ave, Ocean City, NJ (US) 08226

( * ) Notice: Subject to any disclaimer, the term of this patent is extended or adjusted under 35 U.S.C. 154(b) by 56 days.

(21) Appl. No.: 11/017,295

(22) Filed: Dec. 20, 2004

(65) Prior Publication Data

US 2006/0132703 A1    Jun. 22, 2006

(51) Int. Cl.
*G02C 11/02* (2006.01)
(52) U.S. Cl. .............................. 351/51; 351/41; 351/49; 351/158
(58) Field of Classification Search ................. 351/49, 351/41, 158, 44, 51, 52
See application file for complete search history.

(56) References Cited

U.S. PATENT DOCUMENTS 4,264,154 A * 4/1981 Petersen ...................... 351/49

* cited by examiner

*Primary Examiner*—Hung Xuan Dang
(74) *Attorney, Agent, or Firm*—Alan Kalb

(57) ABSTRACT

A pair of eyeglasses comprises a frame and at least one ear extension support pivotably connected to one end of the frame. At least one lens is rotatably affixed to the frame. At least one bezel is also rotatably affixed to the lens. A means for rotating the lens and the bezel while attached to the frame is also provided.

20 Claims, 7 Drawing Sheets

EYEGLASS SYSTEM HAVING SPINNING BEZELS

FIELD OF THE INVENTION

The present invention relates to eyeglasses, and more particularly to an eyeglass system having at least one rotating feature.

BACKGROUND OF THE INVENTION

Eyeglasses and sunglasses serve a useful purpose in that they help the wearer to see. In the case of sunglasses, they protect the wearer from the harmful rays of the sun or other dangerous natural elements. It is generally known that eyeglasses have always had a fashion component to them. Recently, eyeglasses have been used for other purposes, one purpose is that of attracting attention. Often the wearer of sunglasses or eyeglasses is looking to gain attention from the opposite sex or from the world in general. Eyeglasses and sunglasses are increasingly becoming attention grabbing devices and are often considered fashion statements. New designs emerge almost daily, however, most of these new designs offer merely ornamental differences. The standard components for eyeglasses are generally all the same. Aesthetic changes to the frame or lenses are all that the manufacturers make from one pair of glasses to the next. In order for eyeglasses to evolve there must be true innovation. Until this date, no new true innovations have come forward, eyeglasses have remained basically the same for well over two centuries. There is clearly a need in the art for a pair of sunglasses or eyeglasses that are truly unique and different.

SUMMARY OF THE INVENTION

The present invention is designed to overcome the conventional disadvantages of traditional eye wear. The present invention provides a unique and novel approach to the problem of boring and uninteresting eyewear. The present invention incorporates a system of interchangeable rotating bezels and lenses that are both removably affixed and located about the frames of the eyeglasses. The rotating features of the system create a visual focal point of interest for the wearer. The motion imparted by the spinning bezels instantly grabs the attention of passers-by and onlookers. The wearer needs to do nothing more than simply place the glasses on their head and cause the lenses and bezels to rotate in order to create an attention grabbing scene.

Several embodiments of the invention are provided herein. In one embodiment of the present invention, the bezels free spin on a series of ball bearings incorporated into the frame. The user, with the flick of his/her finger sends the bezels spinning for up to several minutes at a time. The bezels are removably affixed and interchangeable at the wearer's discretion. Many types of bezels that each have their own unique look have been provided for. Some of these spinning bezels also create unique effects for the wearer from behind the glasses. The inventor has also envisioned spinning bezels that create a kaleidoscope affect for the wearer. Other bezels envisioned by the inventor create a soothing or calming affect upon the wearer that may aide in meditation. The inventor even envisions other bezels that create sounds or music when rotated.

In another embodiment of the present invention the spinning bezels are caused to rotate by means of a motor. A small or miniature motor is incorporated into the frame at the bridge of the glasses. The motor is connected to the bezels and causes them to rotate by means of a worm gear system. A small battery is located in the ear piece in order to supply power to the motor. As with the first embodiment, these bezels are interchangeable components of the system and can be removed and replaced with bezels of another style. This embodiment also allows the wearer to remove the motor assembly in order to allow the lenses to spin freely.

For aesthetic purposes the spinning bezels can be formed having a decorative surface. The inventor contemplates that such a surface can also function as a means of advertising. All embodiments of the invention may utilize prescription or tinted lenses, and as previously noted all of the lenses may be interchanged with other styles and types of lenses and bezel combinations. Although the invention has been briefly summarized, other advantages and novel features of the invention will become apparent from the following detailed description when taken in conjunction with the accompanying drawings.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
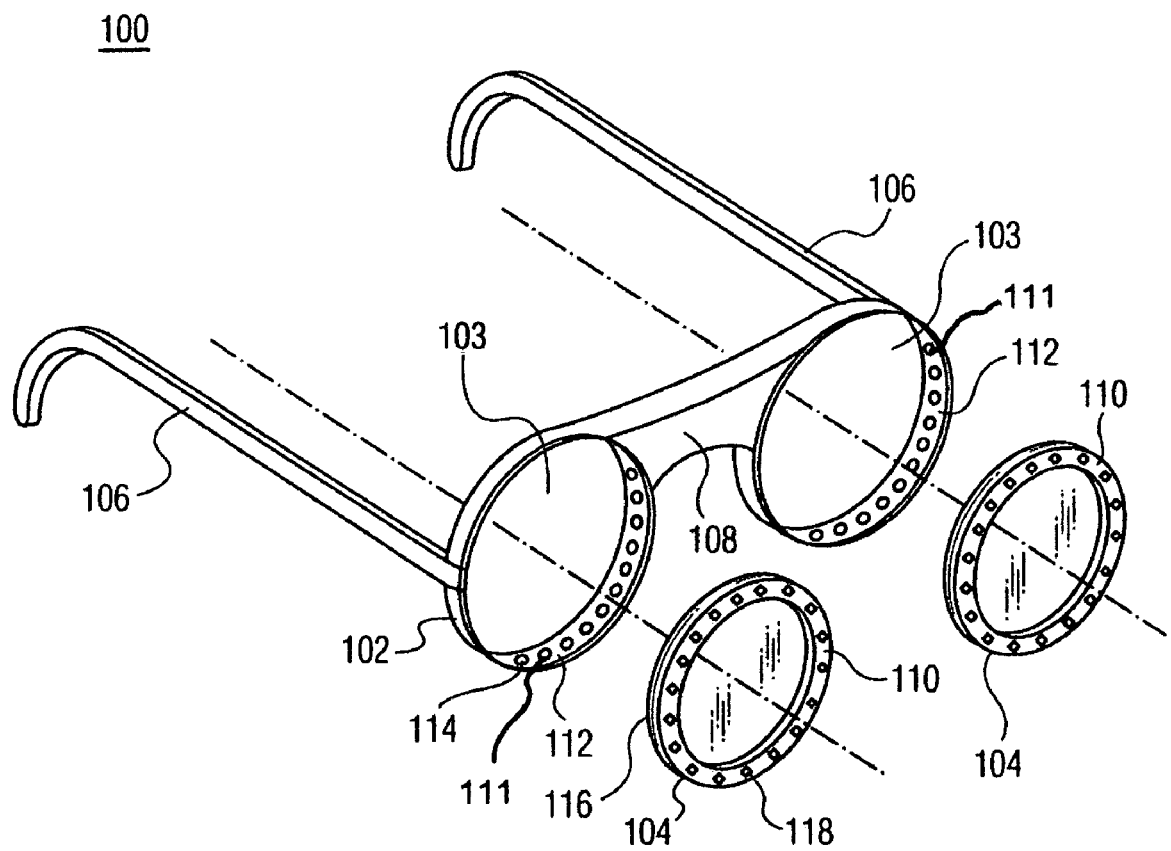
FIG. 1 is an exploded perspective view of an eyeglass system in accordance with the present invention.
Figure 2:
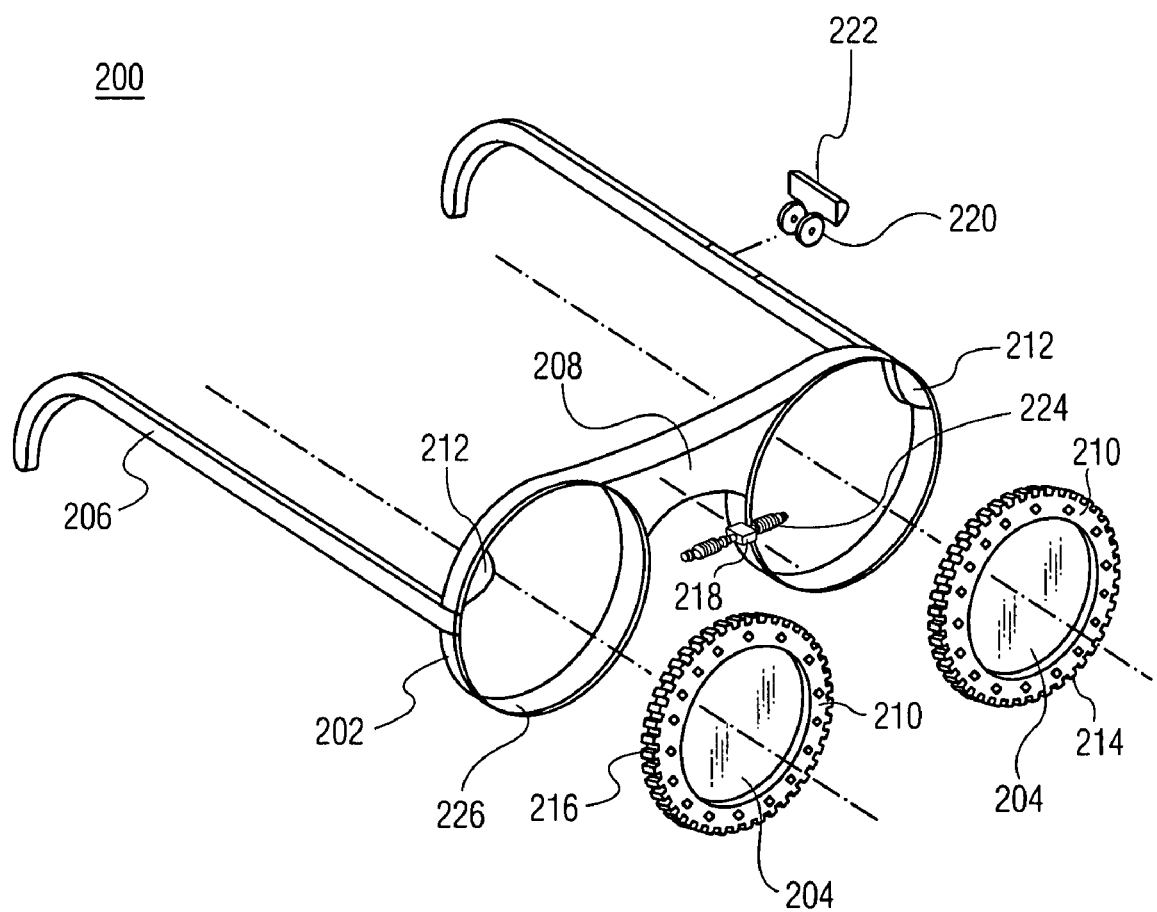
FIG. 2 is an exploded perspective view of an eyeglass system in accordance with another embodiment of the present invention.

Referring to FIGS. 1 through 5, with particular reference to FIGS. 1 and 2, a pair of unique eyeglasses are disclosed. The eyeglasses include the unique feature of spinning bezels and lenses. The lenses and bezels are rotatably affixed to the frame of the eyeglasses. The frame of the eyeglasses includes a pair of pivoting ear extensions and a bridge support. Two embodiments of the invention are depicted herein. The first embodiment, FIG. 1, discloses a free spinning lens and bezel feature. The second embodiment, FIG. 2, discloses a motorized feature for imparting rotation to the lenses and bezels.

FIG. 1 is an exploded perspective view of an eyeglass system 100 in accordance with the present invention. Clearly depicted are a pair of ear extensions 106 pivotably connected to an eyeglass frame 102. The ear extensions 106 retain the eyeglasses 100 on the head of the wearer (not shown). The ear extensions 106 are a common feature well known in the art. The frame 102 of the eyeglass system 100 is that of a simple rounded style. This style has been selected for the purposes of providing a clear depiction. Many more complex styles of frames are contemplated by the inventor, these include but are not limited to; square, rectangular, oval, triangular and aviator style frames. All of the styles of frames that manufacturers make are too numerous to list, however, one skilled in the art will quickly realize the potential possibilities and embodiments that the present invention encompasses.

The eyeglass frame 102 contains two apertures 103 that are formed to allow a pair of rotating lenses 104 and bezels 110 to be received. The apertures 103 of the frame 102 not only allow for the receiving of lenses 104 but they also incorporate a set of unique features that allow the lenses 104 and bezels 110 to rotate while housed in the frame 102. One element of the rotational feature is the race 112. The race 112 is an angular ring formed about the inner circumference of the frame aperture 103. Each of the frame apertures 103 contains a race 112. The race 112 has a concave profile that is formed to receive the lenses 104 and bezels 110. Throughout the race 112 are formed a plurality of miniature apertures 111, the apertures 111 are formed perpendicular to the face of the race 112. Within each of these apertures 111 is seated a small ball bearing 114. A plurality of ball bearings 114 are disposed throughout the race 112 of each aperture 103. The purpose of the ball bearings 114 is to provide a reduced coefficient of friction between the race 114 and the lenses 104 and bezels 110. The reduction of friction allows the lenses 104 and bezels 110 to rotate freely on the bearings 114.

While ball bearings 114 are depicted, the inventor contemplates many other types of bearing surfaces that include, but are not limited to; needle bearings, magnetic levitation bearings, sealed air bearings, and liquid bearings, all of which are commonly known in the art.

To retain the lenses 104 and bezels 110 in the frames 102, the frames 102 are formed to allow the lenses 104 to snap into the frame 102. Another system of retention, as shown in FIG. 2 utilizes clips 212, the clips 212 prevents horizontal movement between the lenses 204 and bezels 210 and the frame 202. The clips 212 as provided in this second embodiment 200 are a molded feature as part of the frame 202. During assembly the lenses 204 and bezels 210 are pushed past the outer clips 212 in order to be captured by the race 226 and held between the clips 212. The inventor further contemplates numerous types of retention features that keep the lenses and bezels within the frames, these include but are not limited to: metal clips, Teflon coated clips, and clips that feature ball bearings on the interior portion so as to aide in the rotation of the lenses and bezels.

It should be noted that the lenses 104 may be rotated in either clockwise or counter-clockwise direction. The method of creating rotational motion for this first embodiment is via the finger of the wearer. More specifically, the wearer of the eyeglasses 100 uses their finger (not shown) to flick the lenses 104 tangentially along the outer circumference in order to impart rotational motion to the eyeglasses 100. This method of imparting rotational motion is specific to this first embodiment 100. While rotation is facilitated by ball bearings 114 located about the edge of the frames 102, other bearing locations are also contemplated by the inventor. One bearing location that is contemplated is that of a central bearing point (not shown). The inventor contemplates the central bearing point as being a pin or needle for the bezels to revolve about. The central pin embodiment includes a pin being affixed through the center of a spoked style of bezel into a lens placed behind the spoked bezel. In this embodiment the lens would be stationery while the bezel would rotate.

The second embodiment is a motorized version of the first embodiment. In this embodiment a miniature motor is mounted in the frames of the eyeglasses. The miniature motor causes the lenses and bezels to rotate. A miniature battery concealed in the ear extension provides electricity to power the miniature motor.

Now referring to FIG. 2 in detail. FIG. 2 is an exploded perspective view of an eyeglass system 200 in accordance with another embodiment of the present invention. In this embodiment the lenses 204 are caused to rotate via a worm gear 224 connected to a motor 218. The bezels 210 of this embodiment are formed having a plurality of gear teeth 214 around the outer circumference of the bezel 210. The gear teeth 214 are designed to mate with the worm gears 224. Looking at the motor 218 in more detail we notice that the motor 218 has a shaft 228 projecting from each end. The shaft 228 of the motor 218 contains two worm gear drives 224. This feature allows the motor 218 to rotate two bezels 210 simultaneously. In this particular embodiment the motor 218 is located in the bridge 208 of the eyeglasses 200. The inventor contemplates numerous other mounting variations. In one embodiment, not shown, the inventor contemplates mounting the miniature motor in the ear pieces, and in another embodiment the inventor contemplates mounting the motor in the edges of the frames. A person skilled in the art would realize numerous other methods of mounting a motor into the eyeglass frames.

While the system depicted in FIG. 2 of the second embodiment of driving the bezels 210 is a worm gear 224, the inventor contemplates numerous other methods of imparting rotational motion via an electric motor 218 to the bezels 210. These other embodiments that have not been shown include, but are not limited to, gears, flexible drives, magnetic induction, and forced air. The inventor has contemplated many numerous variations of methods and systems for rotating bezels 210 and lenses 204 within a pair of eyeglass frames 202 that do not depart from the spirit of the invention.

Depicted in the second embodiment, the method of providing power to the eyeglasses is via a battery 220. The battery 220 in this embodiment is electrically connected directly to the motor 218. A switch (not shown) is located in the frame 202 and allows the wearer to turn on and off the spinning bezels 210. In this embodiment a standard DC single phase motor 218 has been depicted. Similarly, a standard DC battery 220 is also contemplated for this particular embodiment. Other embodiments not shown but contemplated by the inventor include, but are not limited to, sunglasses that utilize a rechargeable battery system, solar powered, and electricity generated by means of a miniature hand crank generator that mounts onto the ear extension of the glasses (not shown).

Another feature of the present embodiment of the invention is that of a removable motor 218. The inventor contemplates that at any time the wearer may remove the motor 218 from the bridge 208 and thus convert the motorized embodiment to that of the first embodiment of the invention. The inventor further contemplates that the motor be removably affixed to the eyeglass frame 202. The removably affixable feature of the motor 218 allows the motor 218 to be snapped in or popped out without any special tools or skills required by the wearer.

The overall modular nature of these embodiments allows the wearer to configure the sunglass system into many different variations. This modular feature allows the wearer a plurality of fashion possibilities to fit any mood or match any outfit they may have.

Figure 3A:
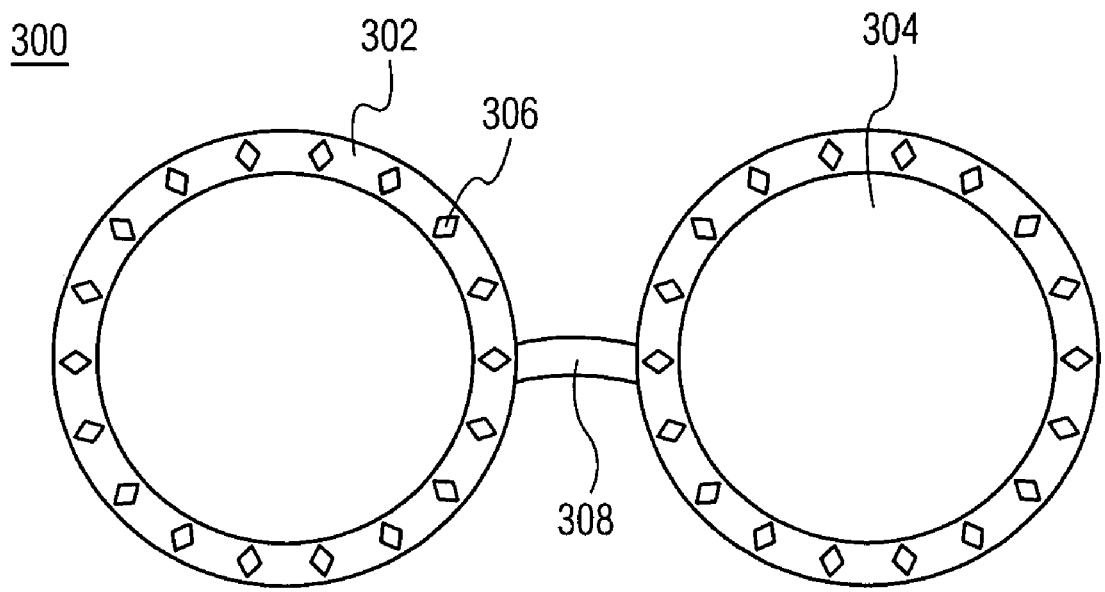
FIG. 3A–3B are frontal plan views of various embodiments of bezels in accordance with the present invention.
Figure 3B:
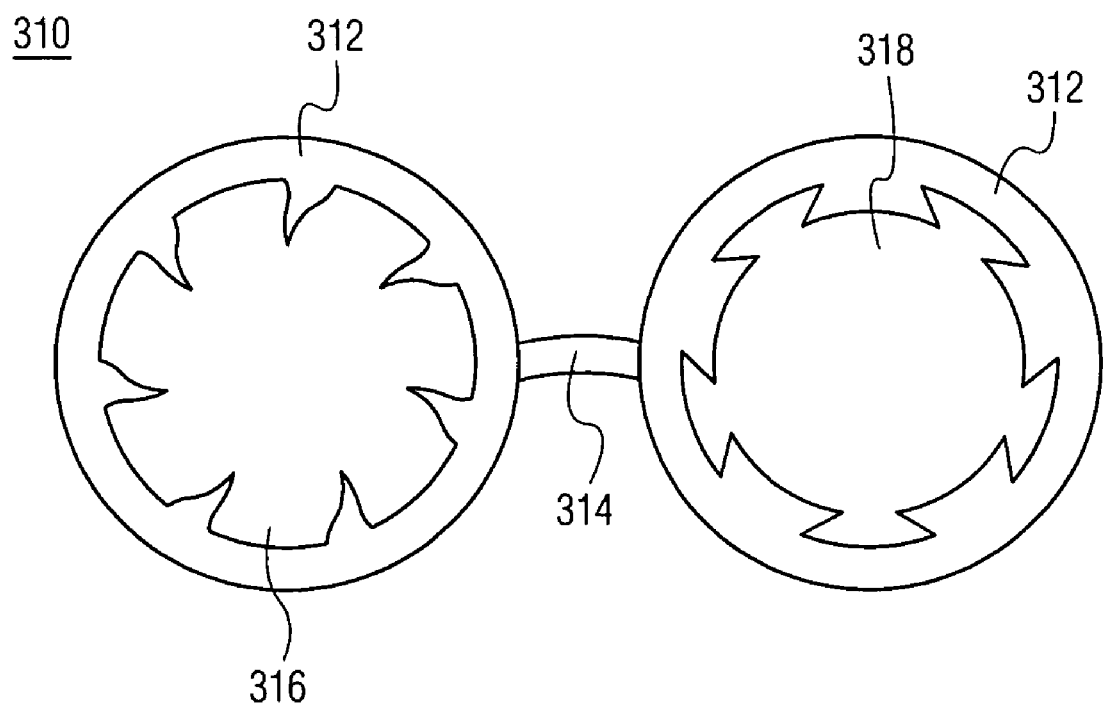

FIG. 3A–3B are frontal plan views of various embodiments of bezels in accordance with the present invention. FIG. 3A depicts the sunglasses 300 in accordance with the present invention having a pair of diamond studded rotating bezels 302. The bezels 302 surround the outer circumference of the lenses 304. A plurality of diamonds 306 are shown affixed or embedded into the bezel 302. A simplified nose bridge 308 joins both of the lenses 304 and bezels 302 together. FIG. 3B depicts yet another embodiment 310 of the present invention showing a different style of bezel 312. This embodiment demonstrates that more than one style of bezel 312 can be worn simultaneously on a single pair of eyeglasses 310. In this embodiment, the left bezel 312 is clearly different than the right bezel 312. The effect created by the spinning bezels 312 is certainly unique. As in the previous embodiment a simple nose bridge 314 has been depicted in order to join both of the lens bezel combinations together.

Figure 4A:
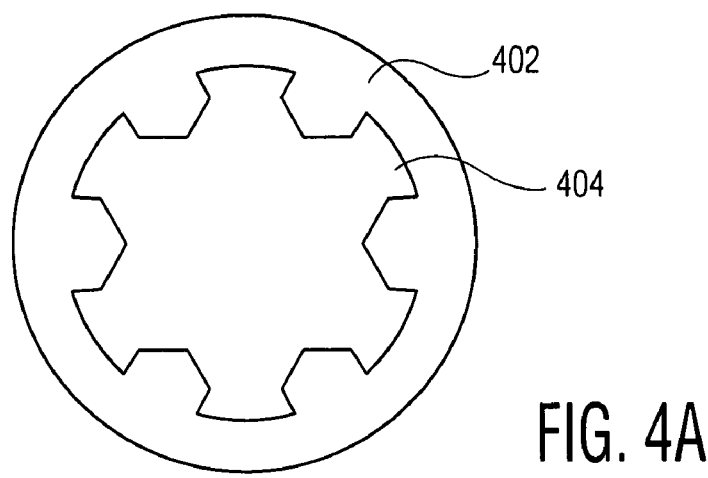
FIG. 4A–4F are frontal plan views of various embodiments of bezels in accordance with the present invention.
Figure 4B:
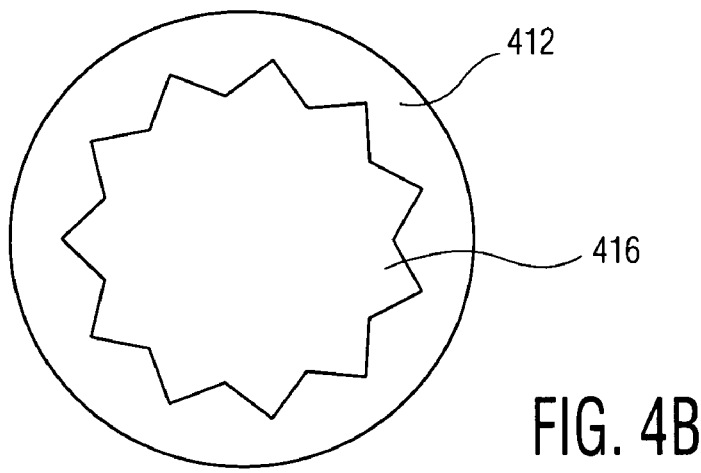
Figure 4C:
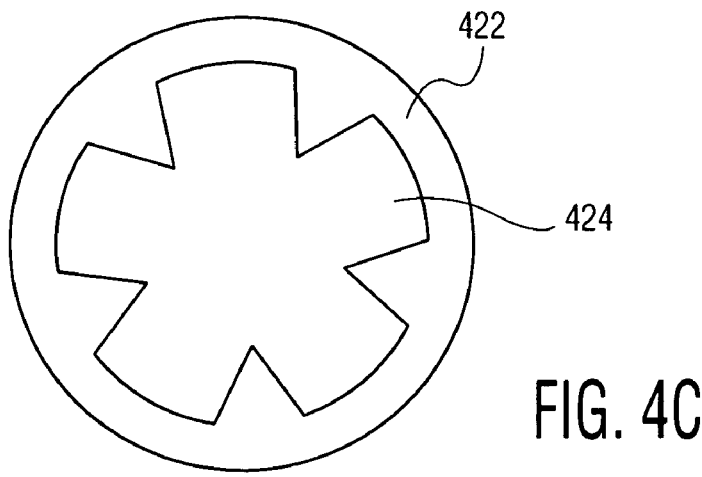
Figure 4D:
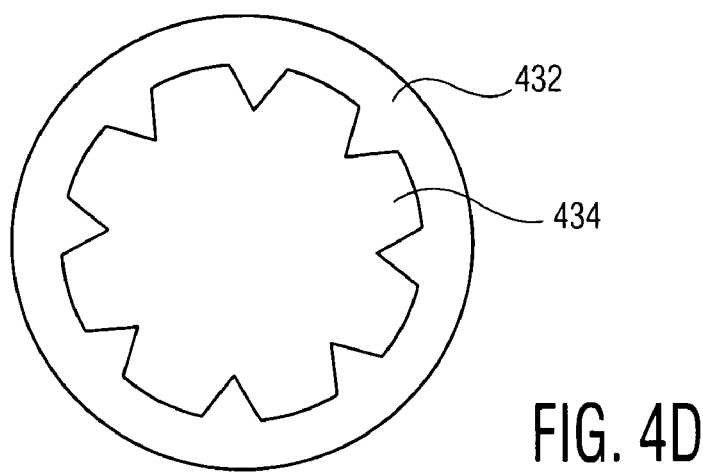
Figure 4E:
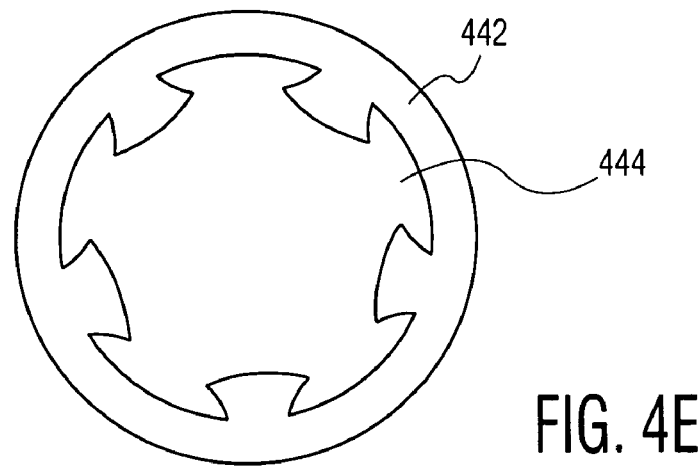
Figure 4F:
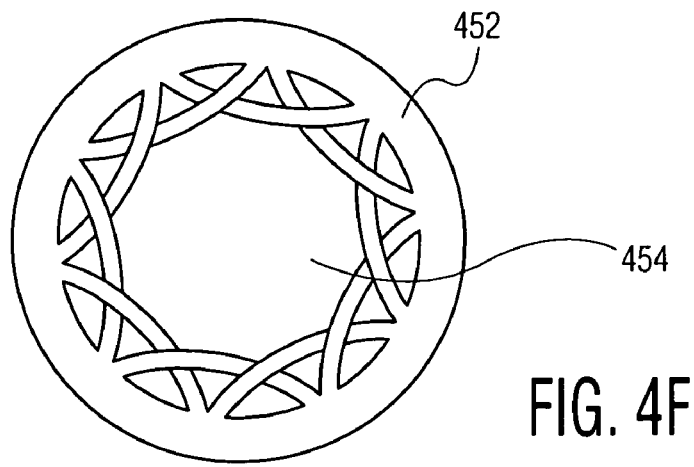

FIG. 4A through 4F are frontal plan views of various embodiments of bezels in accordance with the present invention. FIG. 4A depicts a bezel 402 surrounding a lens 404. The bezel 402 has a unique geometric pattern that creates an interest grabbing effect when spun. FIG. 4B similarly depicts a bezel 412 surrounding a lens 416. This bezel 412 has a different shape than the first bezel 402 and also creates an interest grabbing effect when spun. FIG. 4C similarly depicts a bezel 422 surrounding a lens 424. FIG. 4D also depicts a bezel 432 surrounding a lens 434. FIG. 4E similarly depicts a bezel 442 surrounding a lens 444 and finally, FIG. 4F depicts a bezel 452 having a different style surrounding a lens 454. None of the previously described lens bezels combinations is limited to a specific geometric shape or design. The lens and bezel combinations have been shown using an overall circular design impacted to the exterior of the bezel for the sake of simplicity.

Figure 5A:
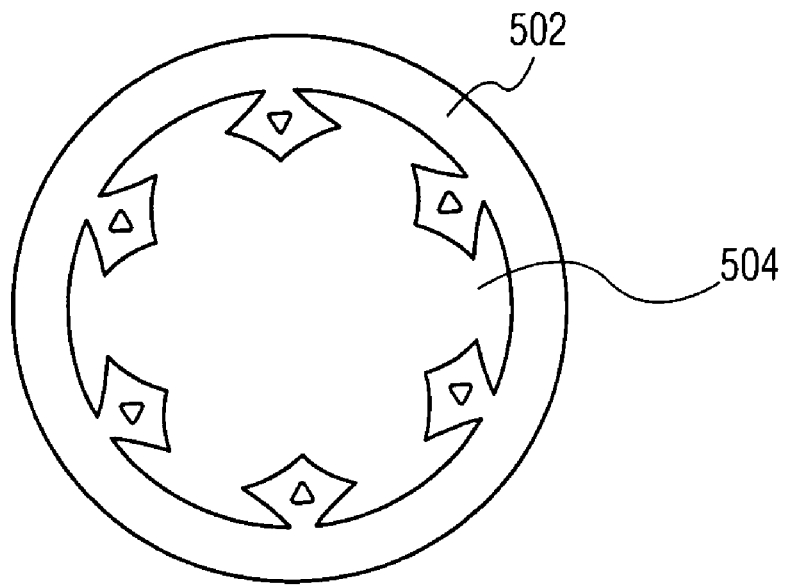
FIG. 5A–5D are frontal plan views of various embodiments of bezels in accordance with the present invention.
Figure 5B:
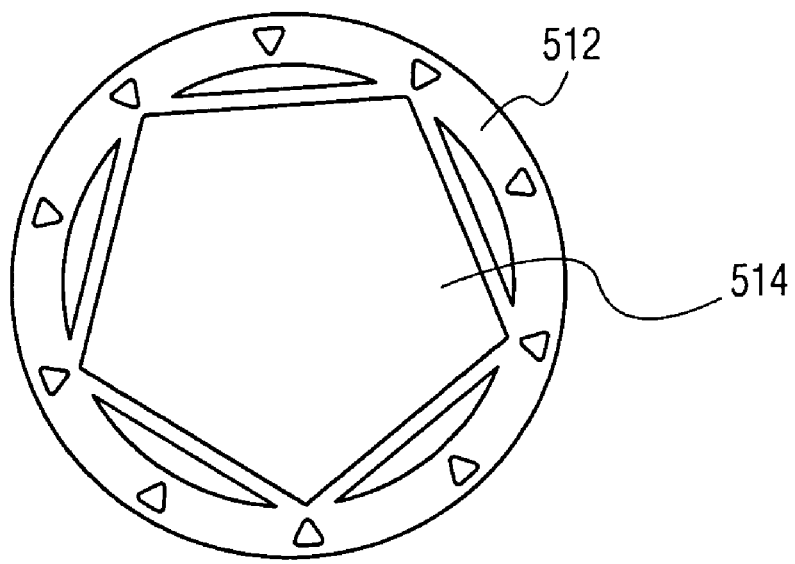
Figure 5C:
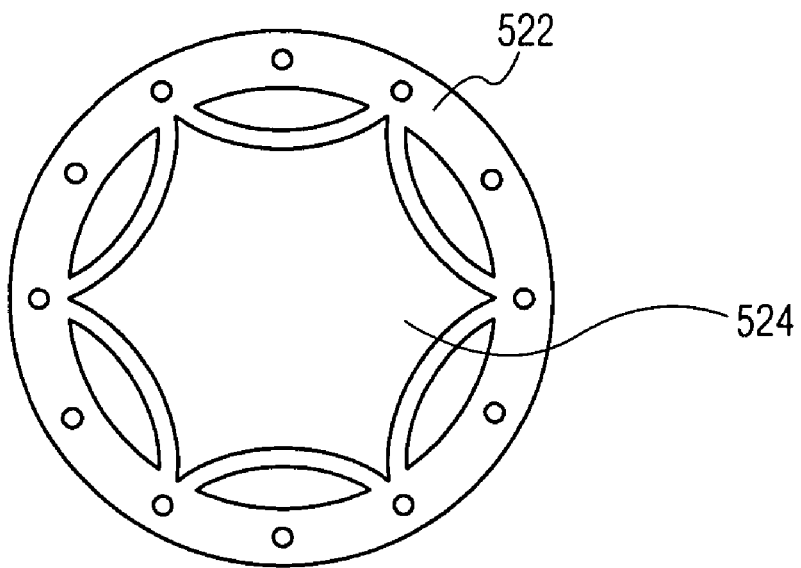
Figure 5D:
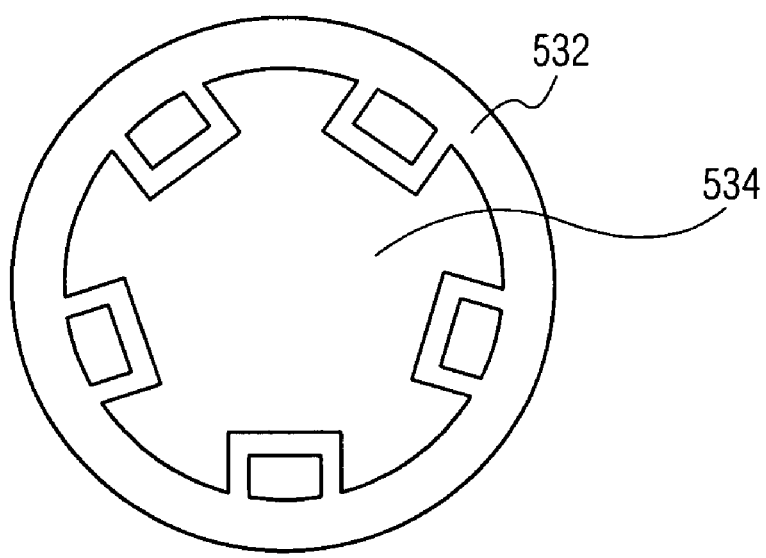

FIG. 5A–5D are frontal plan views of more embodiments of bezel and lens combinations in accordance with the present invention. This final set of lens bezel combinations is provided to show the nearly infinite combinations of bezels and lenses that can be created by one skilled in the art. FIG. 5A depicts a bezel 502 surrounding a lens 504. FIG. 5B similarly depicts a bezel 512 surrounding a lens 514 having a different design. FIG. 5C depicts a bezel 522 surrounding a lens 524 having a unique design. Finally, FIG. 5D similarly depicts yet another bezel 532 surrounding a lens 534 and having a unique design. In all of the previous afore-mentioned combinations, the lenses and bezels rotate within a frame or as the inventor has previously stated the lenses may be affixed within the frame statically while the bezels rotate about both the lenses and the frames.

While the inventor has been described in considerable detail with reference to the preferred embodiments, other versions are possible by modifying the structure. Therefore, the scope of the invention shall not be limited by the specification specified above and the appended claims.

What is claimed is:

1. A pair of eyeglasses comprising:
   (a) a frame;
   (b) at least one ear extension support, that is pivotally connected at one end to the frame;
   (c) at least one lens, that is rotatably affixed to the frame;
   (d) at least one bezel, that is affixed to the lens;
   (e) means for rotating the lens and the bezel while attached to the frame.

2. The eyeglasses of claim 1 wherein said means for rotating is a motor.

3. The eyeglasses of claim 1 wherein said means for rotating is kinetic motion applied by the wearer to the bezels.

4. The eyeglasses of claim 2 further comprising a battery housed in the frame in order to provide power to the motor.

5. The eyeglasses of claim 1 wherein the lens is substantially circular in shape.

6. The eyeglasses of claim 1 wherein the bezel is substantially circular in shape.

7. A pair of eyeglasses comprising:
   (a) a frame;
   (b) a pair of ear extension supports affixed to the frame;
   (c) a plurality of lenses rotatably mounted to the frame; and
   (d) a pair of bezels rotatably mounted to the frame.

8. The sunglasses of claim 7 further comprising a small motor mounted into the frame and connected to the bezels and lenses.

9. The eyeglasses of claim 8 wherein the ear pieces are formed to house at least one battery.

10. The eyeglasses of claim 9 further comprising a battery, wherein the battery is connected to the motor.

11. The eyeglasses of claim 7 wherein the bezels are removably affixed to the frame.

12. The eyeglasses of claim 7 where the lenses are removably affixed to the frame.

13. The eyeglasses of claim 7 wherein the frame further comprises, a plurality of ball bearings to aid in the rotation of the lenses and bezels.

14. The eyeglasses of claim 7 wherein the rotatable element is substantially circular.

15. The eyeglasses of claim 7 wherein the rotatable bezels are free spinning.

16. The eyeglasses of claim 7 wherein the bezels are rotatably connected to one another.

17. An eyeglass system, comprising:
   (a) a frame;
   (b) a plurality of ear extension supports, each of which is pivotally connected at one end of the frame;
   (c) a plurality of detachably and rotatably affixed lenses and bezels;
   (d) a removable motor assembly connected to the frame for rotating the lenses and bezels; and
   (e) at least one battery located in at least one of the ear extension supports connected to the motor assembly for powering the motor.

18. The eyeglass system of claim 17 wherein the bezels contain a tinted lens.

19. The eyeglass system of claim 17 wherein the lenses are prescription lenses.

20. The eyeglass system of claim 17 wherein the bezels counter rotate to one another.

* * * * *